US012400543B2

(12) United States Patent
Fan et al.

(10) Patent No.: US 12,400,543 B2
(45) Date of Patent: Aug. 26, 2025

(54) EVALUATION METHOD OF LOCATIONS, ANALYSIS METHOD OF DRIVING BEHAVIOR, AND DRIVER MANAGEMENT SYSTEM

(71) Applicant: Wistron Corporation, New Taipei (TW)

(72) Inventors: Hui-Lin Fan, New Taipei (TW); Yu-Cheng Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 192 days.

(21) Appl. No.: 18/089,551

(22) Filed: Dec. 27, 2022

(65) Prior Publication Data

US 2024/0054896 A1     Feb. 15, 2024

Related U.S. Application Data

(60) Provisional application No. 63/398,187, filed on Aug. 15, 2022.

(30) Foreign Application Priority Data

Nov. 16, 2022   (TW) .................................. 111143810

(51) Int. Cl.
  *G08G 1/14*         (2006.01)
(52) U.S. Cl.
  CPC .................................... *G08G 1/144* (2013.01)
(58) Field of Classification Search
  CPC ........................... G08G 1/144; G06Q 10/0639
  See application file for complete search history.

(56) References Cited

U.S. PATENT DOCUMENTS

2018/0150764 A1   5/2018   Stenneth
2020/0276982 A1   9/2020   Shoda et al.
(Continued)

FOREIGN PATENT DOCUMENTS

| CN | 103150759 | 11/2015 | |
|---|---|---|---|
| CN | 108647836 | 10/2018 | |
| CN | 108647836 A | * 10/2018 | ........... G06K 9/6223 |

OTHER PUBLICATIONS

"Search Report of Europe Counterpart Application", issued on Aug. 18, 2023, p. 1-p. 15.
(Continued)

*Primary Examiner* — Quan Zhen Wang
*Assistant Examiner* — Mancil Littlejohn, Jr.
(74) *Attorney, Agent, or Firm* — JCIPRNET

(57) ABSTRACT

An evaluation method of locations, an analysis method of driving behavior, and a driver management system are provided. In the method, sensing data is obtained. A parking state is determined according to the sensing data. A parking location category corresponding to the sensing data under the parking state is obtained. A location suggestion model is trained according to the parking location category and the sensing data. The location suggestion model is used for suggesting a parking location. The location suggestion model is trained through a machine learning algorithm. An energy-saving score of the sensing data is determined according to one or more energy-saving factors. The driving behavior report is generated according to the energy-saving scores. The energy-saving factor is a factor that affects energy consumption of the vehicle. The driving behavior report describes whether the energy-saving score is good or bad. Accordingly, the training and work efficiency could be improved.

17 Claims, 14 Drawing Sheets

(56) References Cited

U.S. PATENT DOCUMENTS

2022/0044198 A1  2/2022  Meister
2022/0136847 A1  5/2022  Higuchi et al.

OTHER PUBLICATIONS

"Office Action of Taiwan Counterpart Application", issued on Sep. 4, 2023, p. 1-p. 7.

* cited by examiner

EVALUATION METHOD OF LOCATIONS, ANALYSIS METHOD OF DRIVING BEHAVIOR, AND DRIVER MANAGEMENT SYSTEM

CROSS-REFERENCE TO RELATED APPLICATION

This application claims the priority benefit of and U.S. provisional application Ser. No. 63/398,187, filed on Aug. 15, 2022, and Taiwan application serial no. 111143810, filed on Nov. 16, 2022. The entirety of the above-mentioned patent application is hereby incorporated by reference herein and made a part of this specification.

BACKGROUND

Technical Field

The disclosure relates to a data analysis technology, and more particularly, to an evaluation method of locations, an analysis method of driving behavior, and a driver management system.

Description of Related Art

Working conditions of motorcade industry have caused problems such as aging of driver workforce and a high mobility rate of drivers. In recent years, the epidemic has sharply increased the demand for global logistics industry, and it is necessary to hire more novice drivers to solve a large number of delivery businesses. Therefore, the importance of improving education and training of the novice drivers is not only related to the safety of the drivers, but also affects the business of the motorcade (for example, cost increases due to fines or car damage).

The shortage of drivers is becoming increasingly serious. Some countries even open up for foreign drivers to fill the gap of driver shortage. When drivers arrive in a new country, delivery efficiency of the drivers may be low due to unfamiliarity of traffic conditions. If the delivery scope is in the urban area, it is more difficult for the novice drivers to find a location for parking and delivery.

SUMMARY

Accordingly, the disclosure is directed to an evaluation method of locations, an analysis method of driving behavior, and a driver management system, which are adapted to automatically suggest a parking location and determine whether the driving behaviour is good or bad.

An embodiment of the disclosure provides an evaluation method of locations, which includes (but is not limited to) the following steps. Sensing data is obtained. A parking state is determined according to the sensing data. A parking location category is obtained corresponding to the sensing data under the parking state. A location suggestion model is trained according to the parking location category and the sensing data, wherein the location suggestion model is used for suggesting a parking location.

An embodiment of the disclosure provides an analysis method of driving behavior, which includes (but is not limited to) following steps. Sensing data is obtained. An energy-saving score of the sensing data is determined according to one or multiple energy-saving factors. A driving behavior report according to the energy-saving score is generated, wherein the energy-saving factor is a factor that affects energy consumption of a vehicle, and the driving behavior report describes whether the energy-saving score is good or bad.

An embodiment of the disclosure provides a driver management system including a server. The server is communicatively connected to an on-board device. The server obtains a parking location category corresponding to sensing data of the on-board device under a parking state, and trains a location suggestion model according to the parking location category and the sensing data, wherein the location suggestion model is used for suggesting a parking location.

An embodiment of the disclosure provides a driver management system including a server. The server is communicatively connected to an on-board device. The server determines an energy-saving score of sensing data of the on-board device according to one or more energy-saving factors, and generates a driving behavior report according to the energy-saving score. The energy-saving factor is a factor that affects energy consumption of a vehicle equipped with the on-board device, and the driving behavior report describes whether the energy-saving score is good or bad.

Based on the above descriptions, the evaluation method of locations, the analysis method of driving behavior, and the driver management system are adapted to collect sensing data to suggest parking locations and/or evaluate driving behaviors. In this way, task execution efficiency and driving safety are improved, which facilitates management of motorcade operators.

To make the aforementioned more comprehensible, several embodiments accompanied with drawings are described in detail as follows.

DESCRIPTION OF THE EMBODIMENTS

Figure 1:
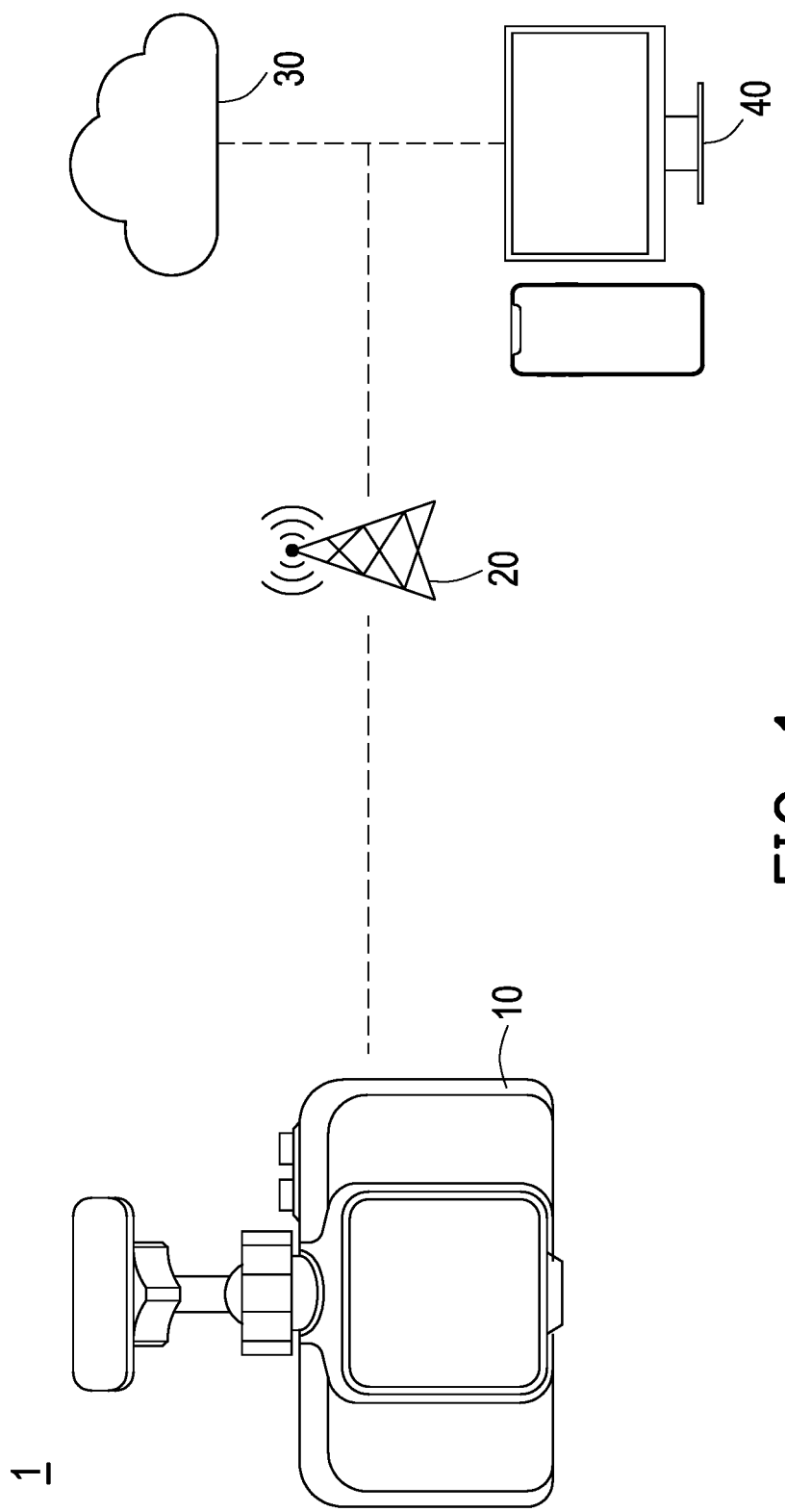
FIG. 1 is a schematic diagram of a driver management system according to an embodiment of the disclosure.

FIG. 1 is a schematic diagram of a driver management system 1 according to an embodiment of the disclosure. Referring to FIG. 1, the driver management system 1 includes one or multiple on-board devices 10, a network access device 20, a server 30 and one or multiple remote devices 40.

The on-board device 10 is an electronic device that is loaded, erected, placed, or built into a vehicle. The network access device 20 (as shown in FIG. 1) may be a base station, a router, a relay station, a core network device, or a combination thereof. In an embodiment, the on-board device 10 is connected to the Internet, a local area network, or a private network via the network access device 20. In another embodiment, the on-board device 10 may directly communicate with other devices. The server 30 may be a smart phone, a tablet computer, a desktop computer, a notebook computer, or a cloud platform device. The remote device 40 (as shown in FIG. 1) may be a smart phone, a tablet computer, a desktop computer, a notebook computer, a wearable device, or an intelligent assistant device.

Figure 2:
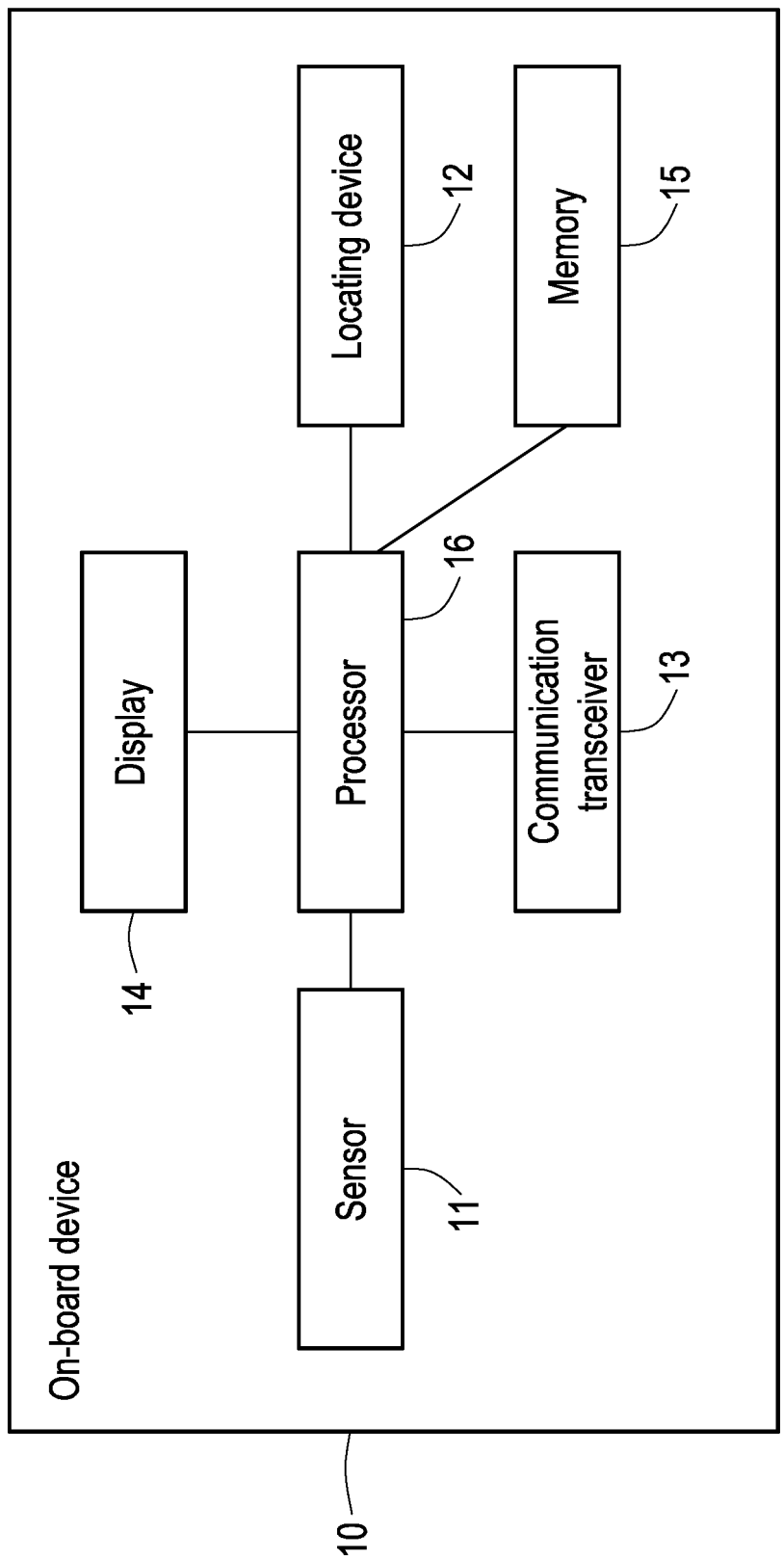
FIG. 2 is a component block diagram of an on-board device according to an embodiment of the disclosure.

FIG. 2 is a component block diagram of the on-board device 10 according to an embodiment of the disclosure. Referring to FIG. 2, the on-board device 10 includes (but is not limited to) one or multiple sensors 11, a locating device 12, a communication transceiver 13, a display 14, a memory 15, and a processor 16.

The sensor 11 may be an image sensor, an accelerometer, a gyroscope, an electronic compass, an inertial sensor, an on-board diagnostic system (OBD), and/or a thermometer. In one embodiment, the sensor 11 is configured to obtain sensing data. The sensing data may be an image, an acceleration, a speed, a steering, an angular velocity, a vehicle speed, an engine speed, and/or a braking behavior.

The locating device 12 may be a receiver supporting global positioning system (GPS), GLONASS system, Galileo positioning system, BeiDou navigation satellite system, or other satellite positioning systems. For example, a 10 MHz and 1 PPS (one pulse per second) precise time source is obtained through an ANT antenna. In an embodiment, the locating device 12 is used for receiving locating signals and generating location information and/or time information accordingly. The location information may be latitudes and longitudes, coordinates in other geographic coordinate systems, or a relative location. Time information may include a time zone, a time and/or a date. For example, the national marine electronics association (NMEA) data is an instance. In some embodiments, one or multiple batches of the location information and the corresponding time information thereof may be recorded as a locating record.

The communication transceiver 13 may be a transceiver supporting wireless communication technologies such as Wi-Fi, mobile network or Bluetooth, or supporting wired communication technologies such as Ethernet, optical fiber network, and USB. In an embodiment, the communication transceiver 13 is used to transmit or receive data to or from an external electronic device (for example, the network access device 20, the server 30 or the remote device 40).

The display 14 (optional) may be a liquid crystal display (LCD), a light-emitting diode (LED) display, an organic light-emitting diode (OLED), a quantum dot display, or other types of displays. In an embodiment, the display 14 is used for displaying images or user interfaces.

The memory 15 may be any type of a fixed or removable random access memory (RAM), a read-only memory (ROM), a flash memory, or similar elements or a combination thereof. In an embodiment, the memory 15 stores program codes, device configurations, codebooks, temporary or permanent data (for example, sensing data, location information, energy-saving scores, or driving behavior reports).

The processor 16 may be a central processing unit (CPU), a graphic processing unit (GPU), or other programmable general-purpose or special-purpose microprocessors, digital signal processors (DSPs), programmable controllers, field programmable gate arrays (FPGAs), application-specific integrated circuits (ASICs), neural network accelerators, or other similar elements or a combination thereof. In an embodiment, the processor 16 is configured to execute all of or a part of operations of the on-board device 10. In some embodiments, functions of the processor 16 may be realized by software or chips.

In some embodiments, one or multiple components of the on-board device 10 may be separated into other independent devices (for example, Internet of things (IoT) devices, driving recorders, or smartphones), and these devices may form a vehicle-mounted system. Each device in the vehicle-mounted system may transmit or receive data to/from each other through the communication transceiver 13.

Figure 3:
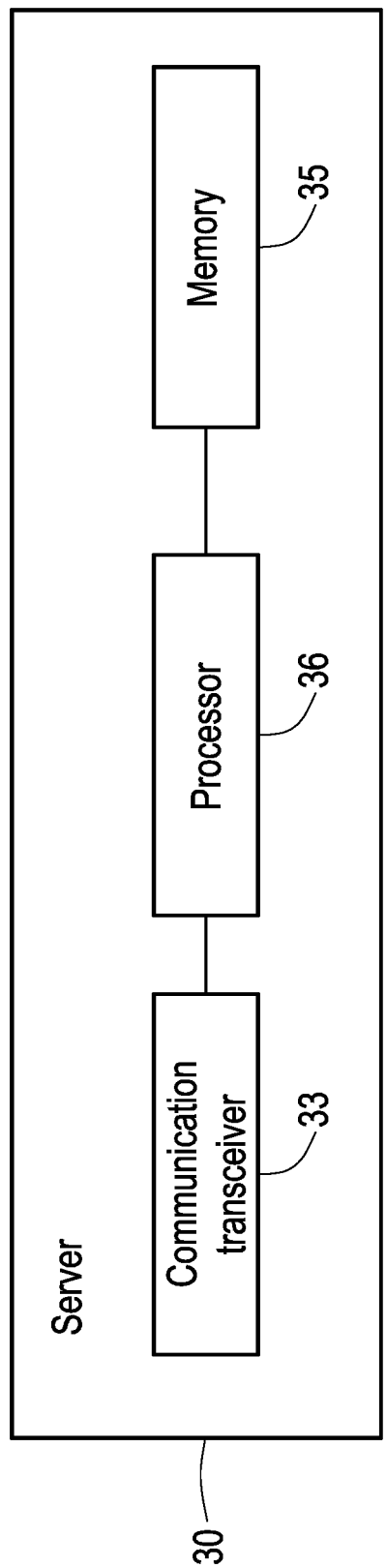
FIG. 3 is a component diagram of a server according to an embodiment of the disclosure.

Referring to FIG. 3, FIG. 3 is a component diagram of a server 30 according to an embodiment of the disclosure. The server 30 includes (but is not limited to) a communication transceiver 33, a memory 35, and a processor 36.

Regarding implementations and functions of the communication transceiver 33, the memory 35, and the processor 36, reference may be made to the communication transceiver 13, the memory 15, and the processor 16 in FIG. 2, and details thereof are not repeated. In an embodiment, the processor 36 is configured to execute all of or a part of operations of the server 30.

In the following description, the method of the embodiment of the disclosure will be described with reference to various devices and/or components in the driver management system 1. Each step of the method of the embodiment of the disclosure may be adjusted according to an actual implementation situation, but the disclosure is not limited thereto.

Figure 4:
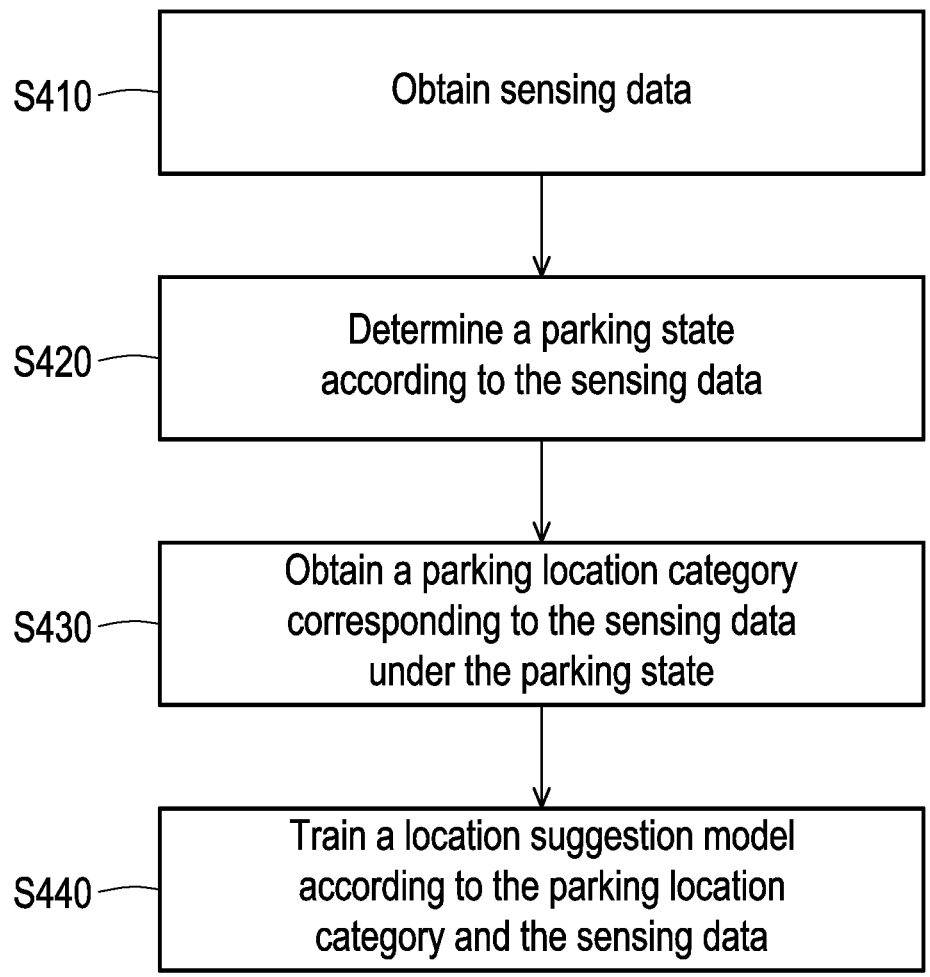
FIG. 4 is a flow diagram of an evaluation method of locations according to an embodiment of the disclosure.

FIG. 4 is a flow diagram of an evaluation method of locations according to an embodiment of the disclosure.

In step S410, the processor 16 of the on-board device 10 obtains sensing data.

In an embodiment, the processor 16 of the on-board device 10 obtains the sensing data through one or multiple the sensors 11.

To be specific, as described above on the sensor 11 in FIG. 1, according to the type of the sensor 11, the sensing data may be an image, an acceleration, a speed, a steering, an angular velocity, a vehicle speed, an engine speed, and/or a braking behavior. However, the type of the sensing data is not limited to the aforementioned types, and the sensing data may be related to any state or parameter of vehicle operation.

In step S420, the processor 16 of the on-board device 10 determines a parking state according to the sensing data.

Specifically, the parking state represents whether the vehicle loaded with, erected with, configured with or in-built with the on-board device 10 is parked. For example, the vehicle is flame out or is stationary.

With regard to the determination of the parking state, in an embodiment, the sensing data includes locating records and in-vehicle images. The locating record is a record of one or multiple timestamps and corresponding vehicle locations. A current location of the vehicle may be determined according to a locating signal of the locating device 12 and/or sensing data of an inertial sensor. For example, when the locating device 12 does not receive a locating signal, the processor 16 may estimate a subsequent location based on the sensing data of the inertial sensor through an inertial navigation technology. The in-vehicle image may be directed at a driver and/or other passengers.

The processor 16 may determine a stay time of the vehicle according to the locating record. For example, the processor 16 checks whether the location of the vehicle changes or changes within an allowable range (related to an error of the locating device 12 or the sensor 11) at every specific time interval (for example, 1 minute, 3 minutes or 5 minutes). If the location is not changed or the change of the location is within the allowable range, the processor 16 accumulates the stay time.

The processor 16 of the on-board device 10 may determine whether a passenger in the vehicle leaves a seat according to the in-vehicle image. Depending on a type of task, the identified passenger may be a passenger in a driver's seat. The processor 16 may apply a known image recognition technology of neural network or feature comparison to determine whether the passenger has left the seat. For example, no passenger is detected in the driver's seat.

The processor 16 of the on-board device 10 may determine the parking state according to a decision result of the stay time and the in-vehicle image. For example, if the passenger on a target seat (for example, the driver's seat) leaves the seat and/or the stay time of the vehicle exceeds a certain time (for example, 3 minutes, 5 minutes, or 10 minutes, which may be related to a statistical delivery time), the processor 16 may decide that the vehicle is in the parking state.

In an embodiment, the processor 16 of the on-board device 10 may determine whether the current location of the vehicle is within a certain distance (for example, 100, 300 or 500 meters) from an expected stay point to assist in confirming the parking state. In an embodiment, the processor 16 determines whether the vehicle is flame out through the sensing data of the sensor 11. For example, the on-board diagnostic system receives a signal for stopping power supply to assist in confirming the parking state.

In an embodiment, the sensing data includes a locating record and an out-vehicle image. The out-vehicle image may be an image in front of or around the vehicle.

Figure 5:
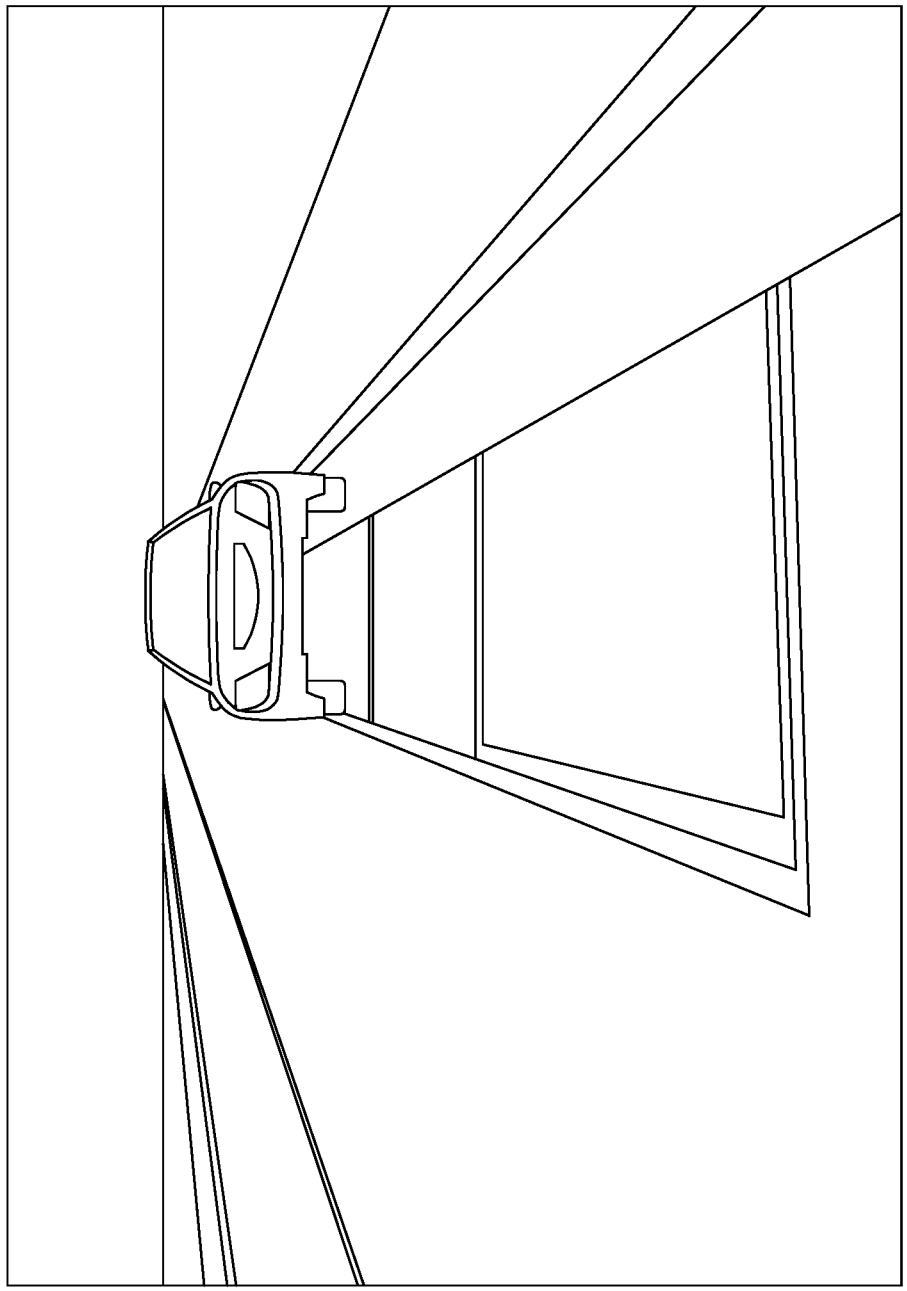
FIG. 5 is a schematic diagram of a parking state according to an embodiment of the disclosure.

For example, FIG. 5 is a schematic diagram of a parking state according to an embodiment of the disclosure. Referring to FIG. 5, the out-vehicle image is an image in front of the vehicle. In response to the parking state, the processor 16 may define the sensing data under the parking state according to the current location in the locating record, the out-vehicle image, and the timestamp. For example, the current location, the out-vehicle image, and the timestamp are combined into a geostamp. The geostamp represents that the vehicle is parked at a specific location at a specific time and has the out-vehicle image. The processor 16 may transmit the sensing data under the parking state to the server 30 through the communication transceiver 13.

In other embodiments, the on-board device 10 may also transmit the sensing data to the server 30 at regular intervals or in response to trigger conditions, and the server 30 executes determination of the parking state. Namely, the server 30 executes step S420.

In step S430, the processor 36 of the server 30 obtains a parking location category corresponding to the sensing data under the parking state.

In an embodiment, the parking location category includes a suggested parking category, a cautioned parking category, and a hazardous parking category. The suggested parking category comply with traffic regulations. "Suggested" means that a parking space is legal, for example, an on-street parking grid, a parking grid in a parking lot, a dock space in an unloading warehouse, etc. The cautioned parking category does not comply with the traffic regulations but a corresponding accident risk (related to an occurrence rate of accidents) is less than a risk threshold. For example, "cautioned" means that this location is not normally suitable for parking, but it may be used for temporary parking, for example, yellow lines or open spaces. The hazardous parking category does not comply with the traffic regulations and the corresponding accident risk is not less than the risk threshold. "Hazardous" means that this location is an illegal parking location with a risk of causing an accident, for example, red line areas.

In an embodiment, the parking location category further includes other/non-suggested parking categories. For example, "other/non-suggested" are locations that the system doesn't recognize, or one-way streets with no yellow or red lines. However, the parking location category may have other variations, and may be changed according to user's needs.

In an embodiment, the processor 36 of the server 30 may determine an initial category corresponding to the sensing data according to a classification rule. The classification rules are related to parking legality. The classification rule may be made with reference to the government's public legal parking location database, road regulations, and parking location data accumulated by drivers of various motorcades or drivers in specific areas. The initial category is one of those parking location categories. Namely, the processor 36 of the server 30 determines which parking location category the sensing data under the parking state belongs to according to the classification rules.

For example, for the suggested parking category: this location is fixed as a driver parking location exceeding a certain percentage (for example, 25, 30, or 50 percent), the out-vehicle image is detected to have a parking grid feature or there are other vehicles in the out-vehicle image that are in the parking state for more than a certain time (for example, 3, 5 or 10 minutes), and this location is within a specific distance (for example, 50, 100, or 200 meters) from a delivery location.

For the cautioned parking category: the road or roadside features detected in the out-vehicle image belong to locations in compliance with the country's traffic regulations that allow temporary short-term parking; or, no other driver has parked in this location before, this location is not a parking grid, and this location has a certain distance from the delivery location (for example, more than 300 meters); the vehicle is parked in a parking grid, but the distance from the delivery location exceeds a certain distance (for example, more than 500 meters); the location is in an open space, has no record of other drivers' parking, and has a certain distance from the delivery location (for example, more than 200 meters); and this location is more than a certain time before stopping on the way to deliver goods, for example, the vehicle does not encounter other vehicles traveling on the road within an hour.

For the hazardous parking category: there was a parking record of drivers at this location, but no road feature for parking is detected in the out-vehicle image. For example, there is no parking grid and there are no other vehicles parked nearby for more than a certain time (for example, 1, 3 or 5 minutes); and this location is in a one-way road but the road is significantly wider than a general road (for example, more than 1.5 times of a road width).

For the other/non-suggested parking category: this location cannot be identified whether parking is allowed (for example, does not belong to the aforementioned categories); the distance from the delivery location exceeds a certain distance (for example, more than 800 meters); and this location is determined to be a no-parking location (for example, sidewalk) after comparing with map information and the road features of the out-vehicle image.

In an embodiment, a route of the vehicle has been determined. The route is a navigation path generated for one or multiple stay points by a navigation system or a path edited by an input operation. The stay points are, for example, delivery locations, scenic spots, or restaurants. The processor 16 may obtain street view images within evaluation ranges (for example, a radius of 300 meters, 500 meters or 1 kilometre) of the stay points. For example, the street view images are downloaded through the communication transceiver 13. Then, the processor 16 may determine parking grids or open spaces through an image identification technology based on a neural network or feature comparison, or transmit the street view images to the server 30 through the communication transceiver 13 and identify the parking grids, open spaces, or other parking locations through the server 30. These parking locations may be combined with their location information for subsequent review.

In an embodiment, the parking grids, open spaces, or other parking locations may be obtained by receiving a recognition operation of a user performed to a navigation map/street view image on an inspector through an input device (not shown). These parking locations may be combined with their location information for subsequent review.

The processor 36 of the server 30 may obtain a review result of the initial category. The review result may be obtained by receiving a marking operation of a user (for example, a motorcade manager or a data processing personnel) performed to the initial category on the inspector through the input device (not shown). The marking operation may be to confirm the initial category or to modify the initial category to be another parking location category.

Figure 6:
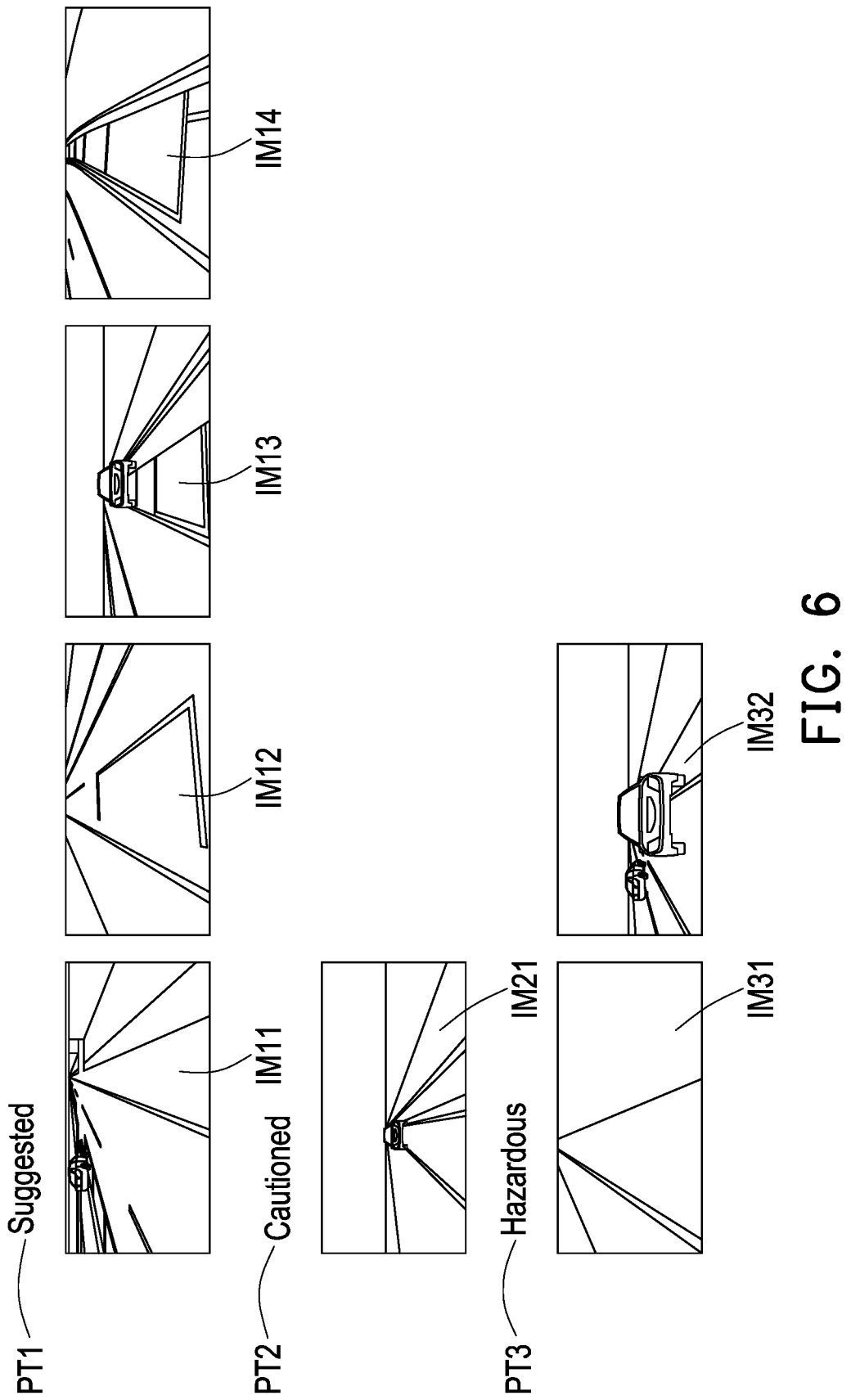
FIG. 6 is a schematic diagram of parking location categories according to an embodiment of the disclosure.

For example, FIG. 6 is a schematic diagram of parking location categories according to an embodiment of the disclosure. Referring to FIG. 6, the inspector (implemented through a display of the on-board device 10, the server 30, or the remote device) may present images (for example, out-vehicle images) classified according to the initial category (for example, the parking location category may be parking locations of a suggested category PT1, a cautioned category PT2 and/or a hazardous category PT3). For example, images IM11-IM14, IM21, IM31, and IM32 of the parking locations belonging to the suggested category PT1, the cautioned category PT2, and the hazardous category PT3 are respectively located in different rows in a user interface displayed on the inspector, and in the user interface, the images of different types are distinguished through category names (such as "suggested", "cautioned", "hazardous" as shown in the figure). Content of the images IM11-IM14 of the suggested category PT1 may be that the vehicle is located on a parking grid, a roadside area without a line or an open space. Content of the image IM21 of the cautioned category PT2 may be that the vehicle is located in a temporary parking area or a parking area with a designated parking time. Content of the images IM31 and IM32 of the hazardous category PT3 may be that the vehicle is located at a no-stop line, a sidewalk, or a bus stop.

It should be noted that in other embodiments, the processor 36 may also directly take the initial category as the parking location category without review, or determine the parking location category entirely by a marking operation.

In step S440, the processor 36 of the server 30 trains a location suggestion model according to the parking location category and the sensing data.

To be specific, the location suggestion model is used for suggesting a parking location, and the location suggestion model is trained through a machine learning algorithm. A machine learning model/algorithm (for example, applying a known neural network, support vector machine (SVM), or random forests) may analyze training samples to obtain regularity from the samples, so as to forecast unknown data through the regularity. The location suggestion model is a machine learning model constructed after learning, which is used to deduce the parking location category to which the parking location belongs or the suggested parking location according to the data to be evaluated (for example, the sensing data). By dividing parking locations into suitable parking locations, temporary parking locations, or high-risk parking locations (for example, suggested, cautioned, or hazardous parking location categories) a database of suitable parking locations is automatically summarized and gradually built through big data analysis and image determination results, so as to obtain the most suggested parking locations for novice drivers. It should be noted that since the parking location is a regional concept rather than a fixed location, data analysis and learning is required to gradually establish the suggested parking area and range.

In addition to the suggestion of the parking locations, the embodiment of the disclosure may also evaluate locations that are easy to violate the traffic regulations.

Figure 7:
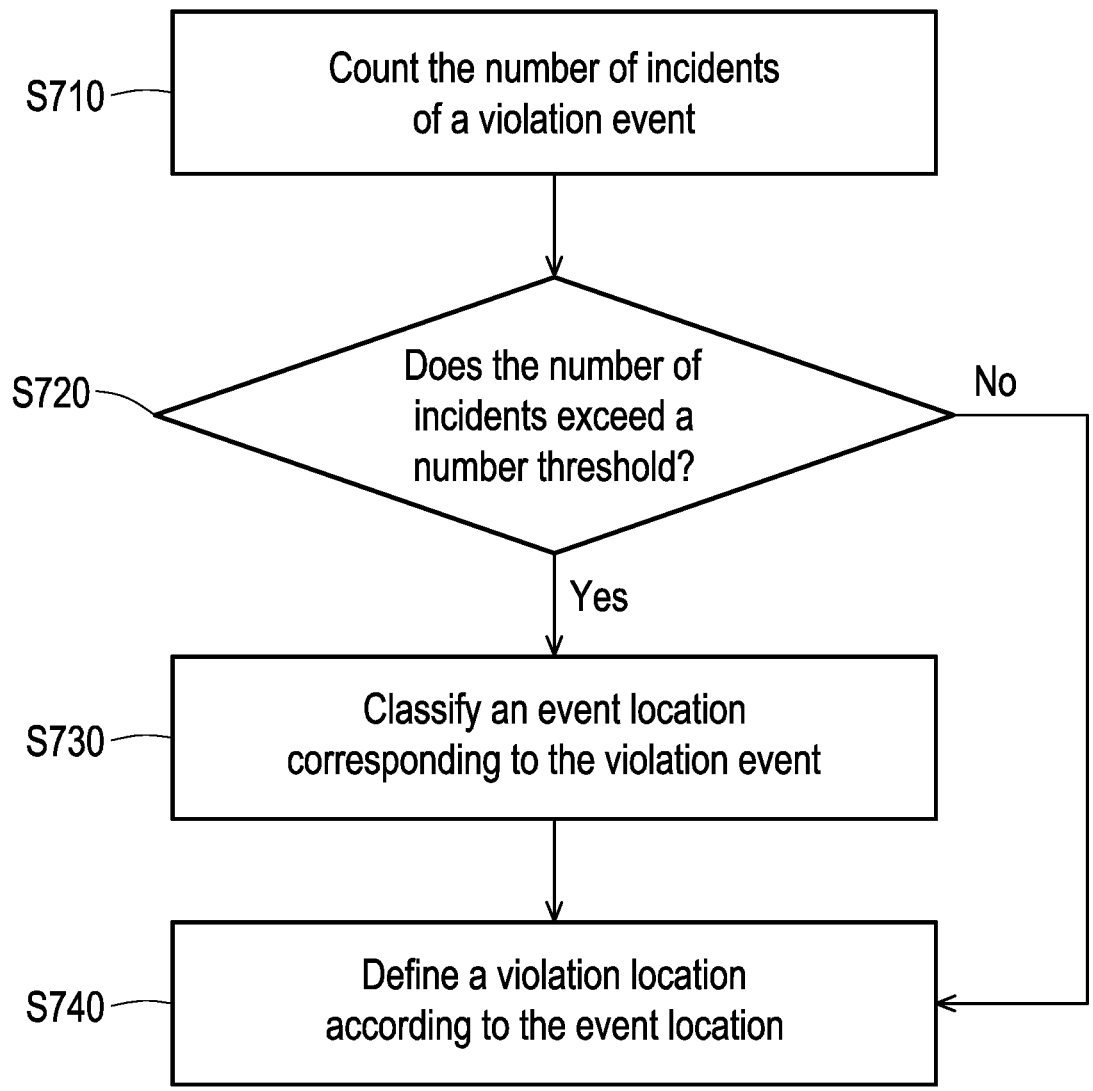
FIG. 7 is a flow diagram of determining a violation location according to an embodiment of the disclosure.

FIG. 7 is a flow diagram of determining a violation location according to an embodiment of the disclosure. Referring to FIG. 7, in step S710, the processor 36 of the server 30 may count the number of incidents of violation events.

In an embodiment, the sensing data includes a locating record, and an occurrence location of the violation event is within a statistical range (for example, a radius of 10, 50 or 100 meters) from a location of the locating record. For example, the violation events are reported by drivers or obtained from a violation record provided by practitioners, or obtained by accessing government's public database (for example, recording time, location, casualties, longitude and latitude) through the communication transceiver 33, or obtained through image recognition of the on-board device 10, or judgement of bad driving behaviors (such as distracted driving, fatigue driving, reverse driving, running red light, sudden braking, sharp turning, idling, or over-speeding) based on inertial sensing data. A statistical time may be 3 days, one week or one month.

In step S720, the processor 36 of the server 30 may determine whether the number of incidents exceeds a number threshold (for example, 10, 20, or 30).

In step S730, for these violation events exceeding the number threshold, the processor 36 of the server 30 may classify the event locations corresponding to these violation events in response to the number of incidents exceeding the number threshold.

For example, the violation events corresponding to the event locations within a radius of 10 or 20 meters are classified into a same event group.

In step S740, the processor 36 of the server 30 may define violation locations according to the event locations. For example, an area range corresponding to a certain event group is marked as a (easy) violation location. Other events that do not exceed the number threshold may be defined as violation location candidates.

Regarding a prompt of the parking location, in an embodiment, the processor 36 of the server 30 may determine a first parking location of the suggested parking category corresponding to a stay point in the route through the location suggestion model. The route is a navigation path generated for one or multiple stay points by a navigation system or a path edited by an input operation. The stay points are, for example, delivery locations, scenic spots, or restaurants.

In an embodiment, the processor 36 of the server 30 may determine whether a street view image within a recommended range (for example, a radius of 100, 200 or 300 meters) of the stay point is the suggested parking category through the location suggestion model. If it belongs to the suggested parking category, the processor 36 takes a location corresponding to the street view image as the first parking location of the suggested parking category. Alternatively, these first parking locations have been stored in the parking database, and the processor 36 of the server 30 may search for the first parking locations within the recommended range from the parking database.

In an embodiment, if there are multiple first parking locations, the processor 36 of the server 30 may sort these first parking locations according to a number of previous parking times. For example, the first parking location with a higher number of parking times is recommended with the highest priority.

Figure 8:
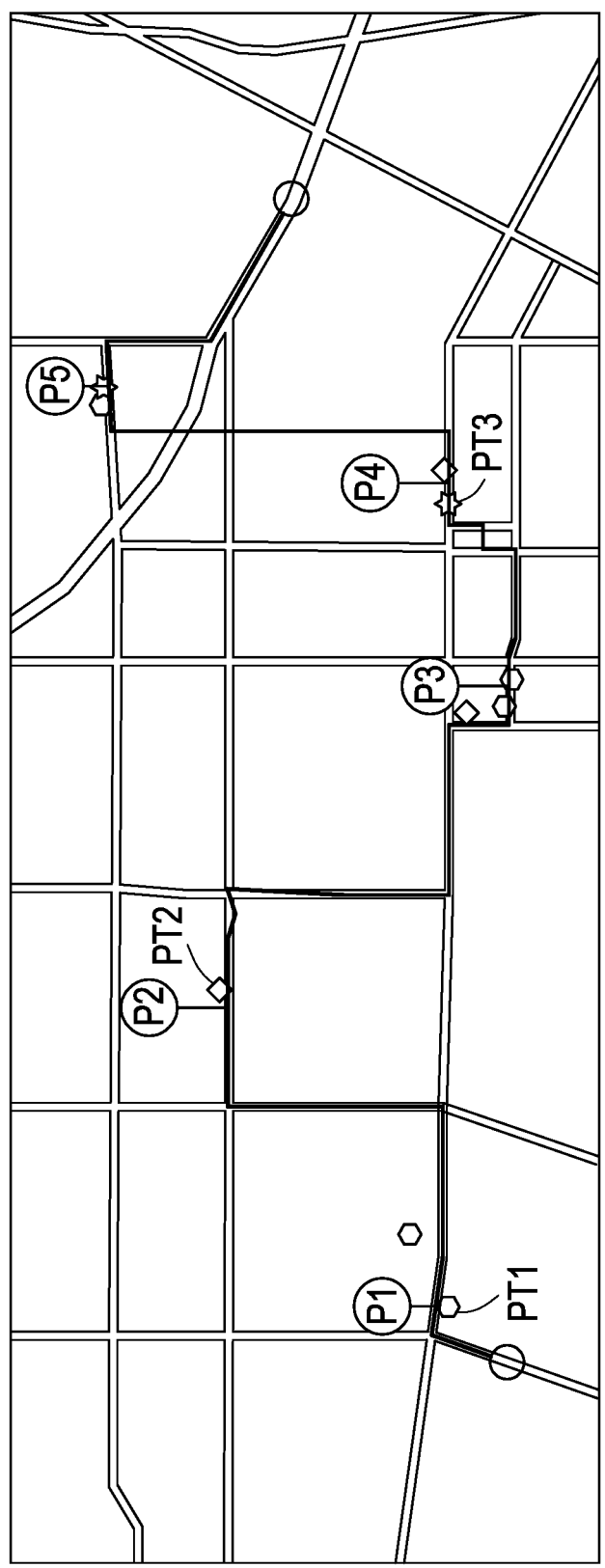
FIG. 8 is a schematic diagram of a parking location suggestion according to an embodiment of the disclosure.

For example, FIG. 8 is a schematic diagram of a parking location suggestion according to an embodiment of the disclosure. Referring to FIG. 8, the route includes stay points P1-P5. The processor 36 of the server 30 may determine the parking locations belonging to the suggested category PT1 within a recommended range (for example, 200 meters) that takes the stay point P1 as a circle center, determine the parking locations belonging to the cautioned category PT2 within the recommended range (for example, 200 meters) that takes the stay point P2 as a circle center, and determine the parking locations belonging to the hazardous category PT3 within the recommended range (for example, 200 meters) that takes the stay point P4 as a circle center. Different parking location categories may be presented in different visual patterns, colors, sizes, or texts.

In an embodiment, in response to the fact that the vehicle is within the recommended range of the stay point, the processor 16 of the on-board device 10 may provide the first parking location and a street view image thereof through the display 14 or the remote device 40 of the passenger.

Figure 9B:
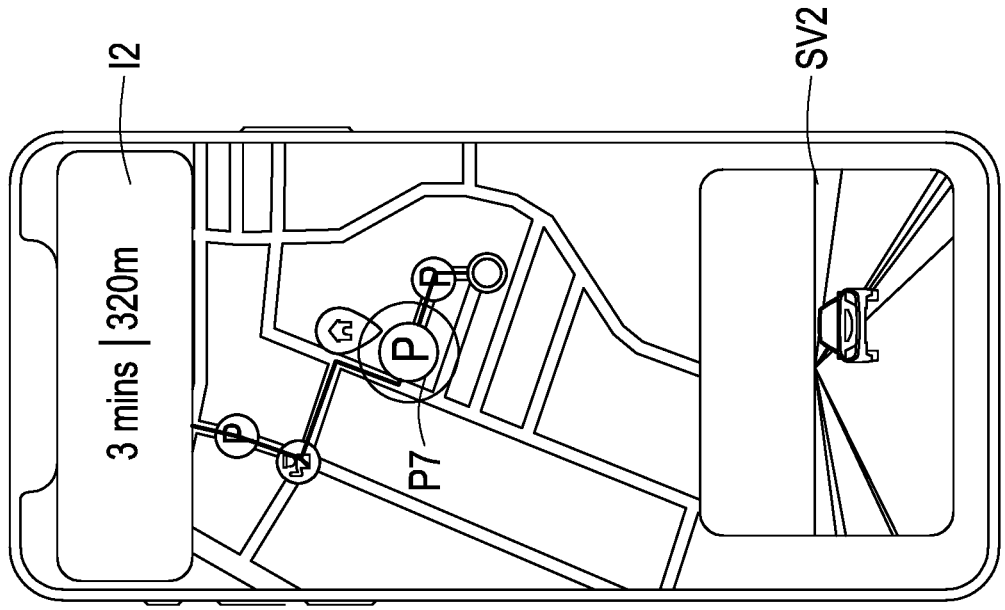
FIG. 9B is a schematic diagram of a parking location suggestion of a remote device according to an embodiment of the disclosure.
Figure 9A:
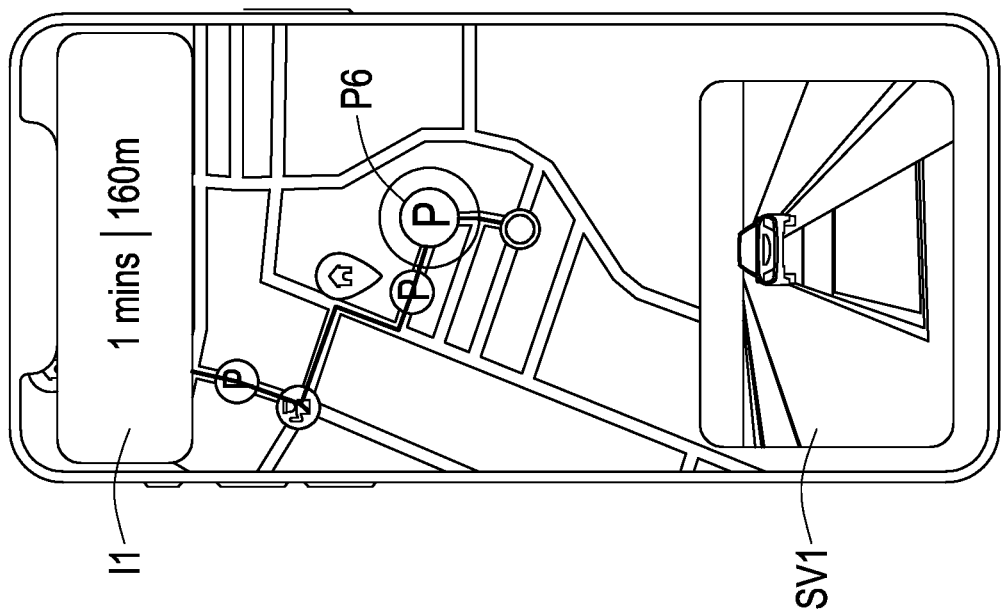
FIG. 9A is a schematic diagram of a parking location suggestion of a remote device according to an embodiment of the disclosure.

For example, FIG. 9A is a schematic diagram of a parking location suggestion of the remote device 40 according to an embodiment of the disclosure. Referring to FIG. 9A, when the vehicle is within 200 meters from the stay point, the remote device 40 may display navigation information I1 (for example, with an estimated arrival time of 1 minute and a distance of 160 meters) of the parking location P6 belonging to the suggested parking category and a street view image SV1.

For another example, FIG. 9B is a schematic diagram of a parking location suggestion of the remote device 40 according to an embodiment of the disclosure. Referring to FIG. 9B, the vehicle continues to move, and the remote device 40 may display navigation information I2 (for example, with an estimated arrival time of 3 minute and a distance of 320 meters) of another parking location P7 belonging to the suggested parking category and a street view image SV2.

In addition to the suggestion of the parking location category, the remote device 40 or the on-board device 10 may also provide suggestions of violation locations. For example, when the location information obtained by the locating device 12 indicates that the vehicle moves within a warning range (for example, with a radius of 50, 100 or 300 meters) from the violation location, the remote device 40 or the on-board device 10 provides the violation location and a street view image thereto.

In an embodiment, the processor 36 of the server 30 may obtain the parking location category corresponding to the street view image within the evaluation range (for example, 100, 200 or 300 meters) of the stay point in the route through the location suggestion model or based on the review result, and provide a second parking location determined as the suggested parking category in the street view image within the evaluation range. Namely, the processor 36 of the server 30 may determine whether the street view image within the evaluation range of the stay point belongs to a suggested parking category through the location suggestion model. If it belongs to the suggested parking category, the processor 36 of the server 30 takes a location corresponding to the street view image as the second parking location of the suggested parking category. The second parking location is stored in the parking database for subsequent access.

In an embodiment, the processor 16 of the on-board device 10 may provide task content through the display 14 or the remote device 40 of the passenger.

Figure 10A:
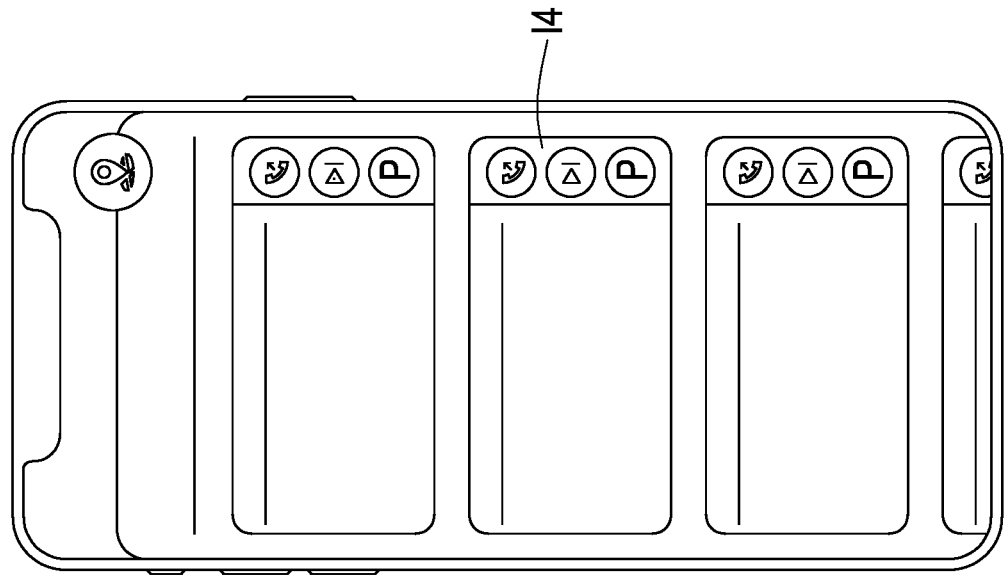
FIG. 10A is a schematic diagram of a task preview of a remote device according to an embodiment of the disclosure.

FIG. 10A is a schematic diagram of a task preview of a remote device according to an embodiment of the disclosure. Referring to FIG. 10A, taking goods delivery as an example, task content 13 includes how many trips to run in total, how many delivery points to deliver in each trip, and displays the weather of the day to remind the driver whether the route is increased or decreased due to the weather.

Figure 10B:
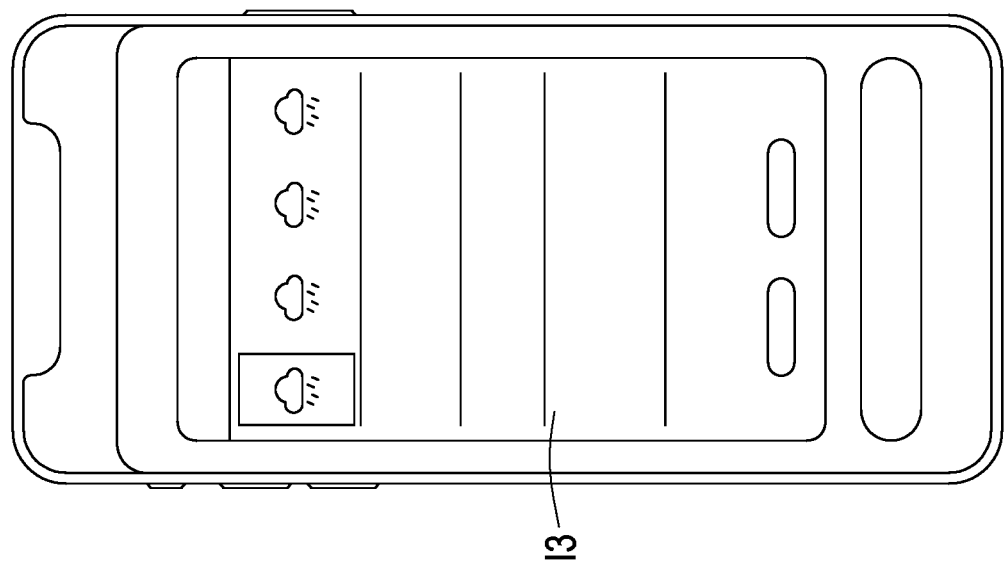
FIG. 10B is a schematic diagram of a task preview of a remote device according to an embodiment of the disclosure.

FIG. 10B is a schematic diagram of a task preview of a remote device according to an embodiment of the disclosure. Referring to FIG. 10B, task content 14 includes delivery details of each task (for example, consignee, address, driving distance, and reminders of violation events). Each task is also equipped with a push-to-talk function to facilitate the user to ask in advance whether the consignee is at home to receive the goods. If the consignee is absent, the remote device 40 may skip the order and automatically re-plan the route by receiving a clicking operation on a skip button in a user interface.

In addition, the remote device 40 may also display in advance candidate locations for suggested temporary parking for this task as shown in FIG. 9A and FIG. 9B, and display a map location of parking hotspots and the street view image thereof. In this way, it is convenient for the driver to directly preview the route through a map mode, and may intuitively observe the delivery point, a reminder icon of the violation event, and a suggested location for the parking hotspot.

In addition, the driver may use functions provided by the on-board device 10 during delivery. For example, navigation of delivery routes, reminders of violation events (through voices and images), suggestions for parking hotspots, and viewing of delivery details (for example, consignee, address, distance, push-to-talk, skipping task). During a delivery process, the parking location or violation location may be reminded by voice, but the voice reminder may also be turned off. The switching of the voice reminder function may be notified to the remote device 40 at a management end to facilitate understanding of a reminder status.

On the other hand, in order to achieve energy-saving and carbon reduction, help motorcade managers reduce a cost problem caused by unnecessary energy consumption, and also implement corporate responsibility for environmental protection, it is necessary to further analyze whether a driving behavior meets energy-saving requirements.

Figure 11:
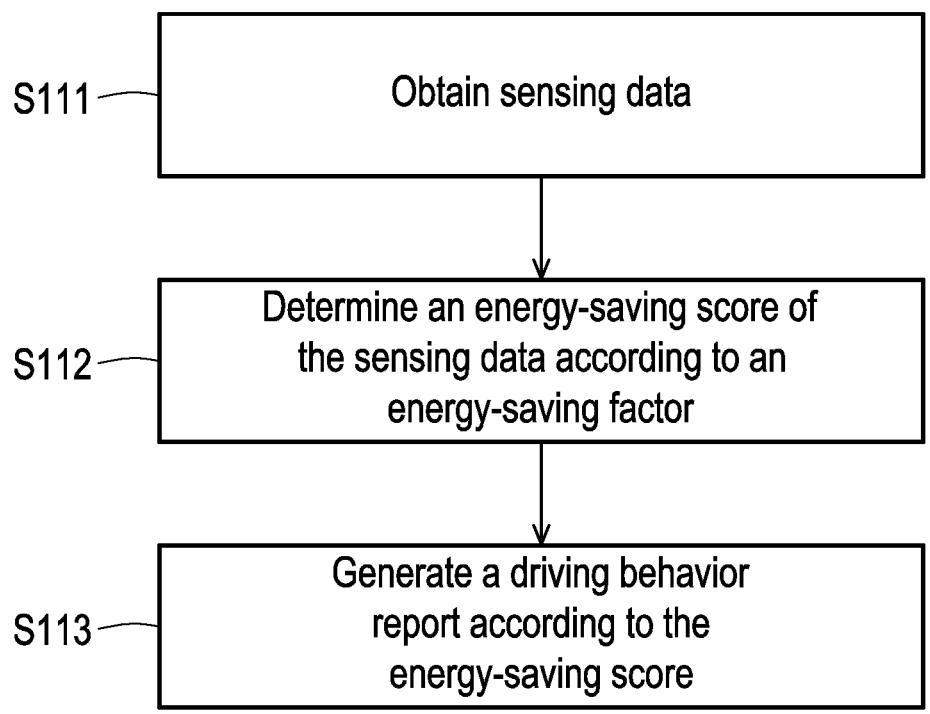
FIG. 11 is a flow diagram of an analysis method of driving behavior according to an embodiment of the disclosure.

FIG. 11 is a flow diagram of an analysis method of driving behavior according to an embodiment of the disclosure. Referring to FIG. 11, the description of step S111 may refer to step 410 in FIG. 4, and detail thereof is not repeated here.

The processor 36 of the server 30 may determine an energy-saving score of the sensing data according to one or multiple energy-saving factors (step S112). Specifically, the energy-saving factors are factors that affect energy consumption of the vehicle.

In an embodiment, the sensing data includes a vehicle speed, the energy-saving factor includes cruise control, and the energy-saving includes a sub-score of the cruise control.

Figure 12:
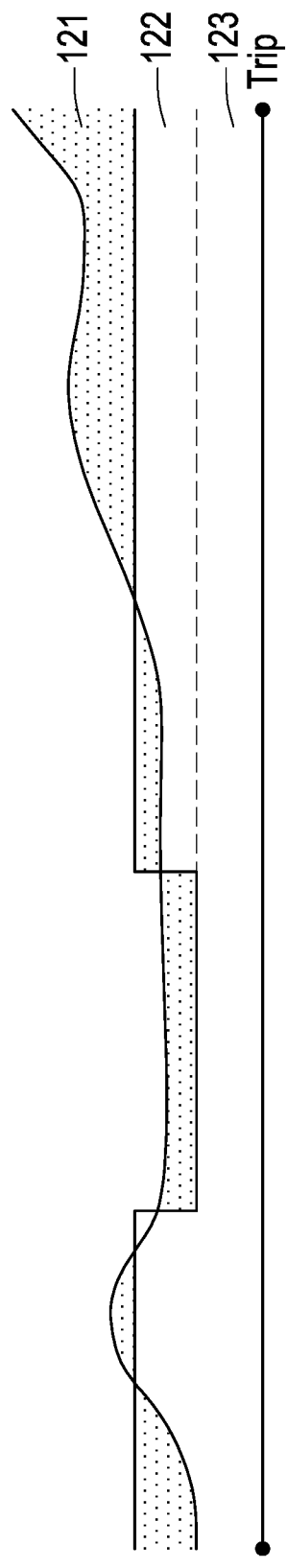
FIG. 12 is a schematic diagram of a cruise control analysis according to an embodiment of the disclosure.

FIG. 12 is a schematic diagram of a cruise control analysis according to an embodiment of the disclosure. Referring to FIG. 12, the processor 36 of the server 30 may count a first accumulative difference between an (actual) vehicle speed 121 and an energy-saving cruising speed 122 during the trip. For example, an absolute value of the difference between the energy-saving cruising speed 122 and the vehicle speed 111 is compared in seconds, and the absolute value of the difference of each second is accumulated.

In an embodiment, the trip may be a total trip for a day or a trip over other time ranges. When the vehicle is completely stationary, no difference is accumulated. The energy-saving cruising speed may vary with the type of vehicle and/or road, and is related to a driving speed under an energy-saving mode.

On the other hand, the processor 36 of the server 30 may count a second accumulative difference between the (actual) vehicle speed 121 and a road speed limit 123 during the trip. For example, an absolute value of the difference between the road speed limit 123 and the vehicle speed 111 (a grid portion as shown in the figure) is compared in seconds, and the absolute value of the difference of each second is accumulated. When the vehicle is completely stationary, no difference is accumulated.

Then, the processor 36 of the server 30 may determine the sub-score of the cruise control according to the first accumulative difference and the second accumulative difference. When the energy-saving cruising speed 122 is greater than the road speed limit 123, the processor 36 of the server 30 may only accumulate the first accumulative difference. When the road speed limit 123 is greater than the energy-saving cruising speed 122, the processor 36 of the server 30 may only accumulate the second accumulative difference.

Then, the processor 36 of the server 30 sums the first accumulative difference and the second accumulative difference. The lower a ratio of the summed value to a total hours of the trip is, the higher the sub-score of the cruise control is. Namely, the higher the proportion of the actual vehicle speed 121 being closer to the energy-saving cruising speed 122 or the road speed limit 123 is, the more energy is saved. The higher the ratio of the summed value to the total hours of the trip is, the lower the sub-score of the cruise control is. Namely, the lower the proportion of the actual vehicle speed 121 being closer to the energy-saving cruising speed 122 or the road speed limit 123 is, the more energy is consumed.

Figure 13:
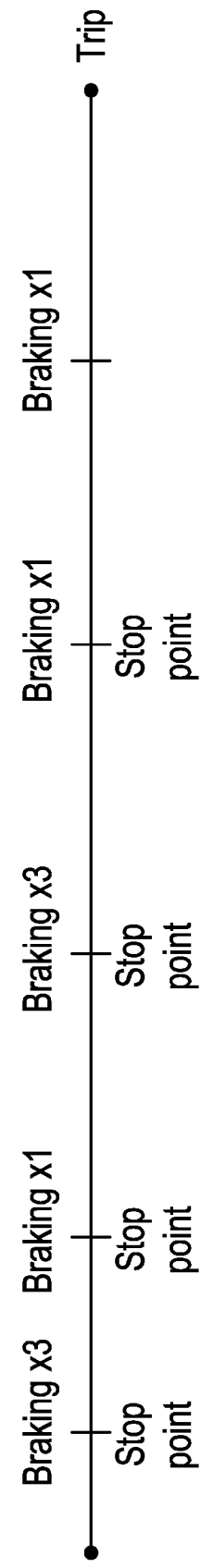
FIG. 13 is a schematic diagram of a coasting analysis according to an embodiment of the disclosure.

In an embodiment, the sensing data includes a braking behavior of the vehicle, the energy-saving factor includes coasting, and the energy-saving score includes a sub-score of coasting. FIG. 13 is a schematic diagram of a coasting analysis according to an embodiment of the disclosure.

Referring to FIG. 13, definition of coasting may be that the vehicle is in 50 meters before a stop line before a red traffic lamp or 50 meters away from a vehicle in the front (however, the distance is not limited to this), and no vehicle is detected in front of the vehicle in the out-vehicle image, and an accelerator of the vehicle is released and the vehicle speed is greater than zero. The processor 36 may count a number of times of braking of the braking behavior of the coasting to one or multiple stopping points during the trip. For example, before reaching a first stop point, the number of times of braking is 3. The processor 36 of the server 30 may determine a sub-score of the coasting in the trip according to the number of times of braking. For example, a braking ratio of all number of times of braking to the number of stop points during the trip is obtained. The higher the braking ratio is, the lower the sub-score of coasting is, and the higher the energy consumption is. The lower the braking ratio is, the higher the sub-score of coasting is, and the more energy is saved.

In an embodiment, the sensing data includes an over-speeding behavior of the vehicle, the energy-saving factor includes over-speeding, and the energy-saving score includes a sub-score of the over-speeding. The processor 36 of the server 30 may combine multiple over-speeding behaviors within one second into one behavior. If a speed difference between the maximum vehicle speed and the road speed limit is greater than an over-speeding threshold (for example, 5 kilometers per hour, 10 kilometers or 15 kilometers per hour), the processor 36 of the server 30 defines the over-speeding behavior accordingly. The processor 36 of the server 30 may determine an over-speeding event according to a duration of the over-speeding behavior. If an interval time (i.e., the duration) defined as two over-speeding behaviors exceeds an interval threshold (for example, 5 seconds, 10 seconds or 20 seconds), the processor 36 of the server 30 defines the over-speeding behavior of this duration as the over-speeding event. If the speed difference is not greater than the over-speeding threshold or the duration does not exceed the interval threshold, the processor 36 of the server 30 continues to detect subsequent over-speeding behaviors.

The processor 36 of the server 30 may count a number of times of over-speeding of the over-speeding events in the trip, and determine the sub-score of the over-speeding according to the number of times of over-speeding. The more the number of times of over-speeding is (for example, greater than a corresponding number of times threshold), the lower the sub-score of over-speeding is, and the more energy is consumed. The less the number of times of over-speeding is (for example, less than the corresponding number of times threshold), the higher the sub-score of over-speeding is, and the more energy is saved.

In an embodiment, the sensing data includes a vehicle speed and an engine speed, the energy-saving factor includes an idling, and the energy-saving score includes a sub-score of the idling. Similarly, the processor 36 of the server 30 may combine multiple idling behaviors within one second into one behavior. The processor 36 may determine the idling behavior according to the vehicle speed and the engine speed. If a statistical vehicle speed (for example, an average vehicle speed or a median vehicle speed) is zero but the engine speed is greater than zero, the processor 36 of the server 30 defines it as the idling behavior. If an interval time (i.e., a duration) between two defined idling behaviors exceeds an accumulative threshold (for example, 10 seconds, seconds or 1 minute), the processor 36 of the server 30 defines the idling behavior of this duration as an idling event. Namely, an idling event occurs under a situation when the vehicle speed is zero but the engine speed is greater than zero.

The processor 36 of the server 30 may count an accumulated idling time of the idling events in the trip. When the idling event is determined, the processor 36 of the server 30 keeps counting a duration of the idling event to serve as the accumulated idling time. The processor 36 of the server 30 may determine the sub-score of idling according to the accumulated idling time. The accumulated idling time is, for example, no more than 3 minutes (determined according to regulations). The longer the accumulated idling time is (for example, greater than a corresponding time threshold), the lower the sub-score of idling is, and the higher the energy consumption is. The shorter the accumulated idling time is (for example, less than the corresponding time threshold), the higher the sub-score of idling is, and the more energy is saved.

In an embodiment, the sensing data includes acceleration the vehicle and vehicle speed, the energy-saving factor includes an anticipation event, and the energy-saving score includes a sub-score of the anticipation event. The processor 36 of the server 30 may determine a sudden braking event according to the acceleration and vehicle speed. The sudden braking event occurs when the acceleration in a traveling direction of the vehicle is lower than an acceleration lower limit and a change period of the vehicle speed is greater than a change upper limit.

For example, the minimum value of a linear accelerometer X-axis (corresponding to the traveling direction) is less than −0.28 g (i.e., the acceleration lower limit, and the symbol g is a gravity unit), and an average accumulated amount of the linear accelerometer X-axis during this period (in seconds) is less than or equal to −2.8 seconds, and an average change period (in seconds) of the vehicle speed during this period is greater than or equal to 5.0 seconds (i.e., the change upper limit). The sudden braking event may be caused by a vehicle in the front or caused by an accident, so that detection of the sudden braking event may be used to the anticipation event.

The processor 36 of the server 30 may combine multiple sudden braking behaviors within one second into one behavior. In a statistical process, if the average linear accelerometer X-axis is less than −0.17 g and the average vehicle speed is greater than zero, the processor 36 of the server 30 may define the behavior as a sudden braking candidate behavior.

If an interval time (i.e., duration) of two sudden braking candidate behaviors exceeds an interval threshold value (e.g., 5 seconds, 10 seconds or 20 seconds), the processor 36 of the server 30 may define the sudden braking candidate behavior of the duration as the sudden braking behavior. Conversely, the processor 36 of the server 30 continues to detect subsequent sudden braking candidate behaviors.

In some embodiments, the processor 36 of the server 30 may also determine a speed and an acceleration of the traffic in the front by recognizing the out-vehicle image, and take it as evaluation of the sudden braking event. Alternatively, the processor 36 may also identify a distance from a vehicle in the front in the out-vehicle image, and prompt the distance from the vehicle in the front to the remote device 40 or the on-board device 10 to reduce the sudden braking behavior or other abnormal braking behaviors.

The processor 36 of the server 30 may count a number of times of sudden brakes of the sudden braking event in the trip, and determine the sub-score of the anticipation event according to the number of times of sudden brakes. The more the number of times of sudden brakes is (for example, greater than a corresponding number threshold), the lower the sub-score of the anticipation event is, and the higher the energy consumption is. The less the number of times of sudden brakes is (for example, less than the corresponding number threshold), the higher the sub-score of the anticipation event is, and the more the energy is saved.

In an embodiment, the sensing data includes an engine speed of the vehicle, the energy-saving factor includes a green band, and the energy-saving score includes a sub-score of the green band. The processor 36 may count an accumulated effective speed time that the engine speed is complied with a target speed (for example, 1400-1600 rpm) in the trip. The target speed is determined according to a vehicle model of the vehicle and road conditions, and is related to the engine speed in the energy-saving mode. For example, the target speed is lower on a downhill road section, but higher on an uphill road section. When the engine speed is within an allowable range (for example, 30-50 rpm) of the target speed, the processor 36 of the server 30 may count and obtain the accumulated effective speed time. The processor 36 may determine the sub-score of the green band according to the accumulated effective speed time. The more the accumulated effective speed time occupies a total time of the trip (for example, greater than a corresponding time threshold), the lower the sub-score of the anticipation event is, and the more energy is consumed. The less the accumulated effective speed time occupies the total time of the trip (for example, less than the corresponding time threshold), the higher the sub-score of the anticipation event is, and the more energy is saved.

In an embodiment, the sensing data includes an in-vehicle temperature of the vehicle, the energy-saving factor includes air conditioner usage, and the energy-saving score includes a sub-score of air conditioner usage. The processor 36 of the server 30 may count an accumulated energy-saving time during the trip when the in-vehicle temperature is complied with a target temperature. The target temperature is determined according to the weather.

For example, summer corresponds to a temperature lower limit, and winter corresponds to a temperature upper limit. When the in-vehicle temperature is within an allowable range (for example, 1 degree or 3 degrees) of the target temperature, the processor 36 of the server 30 may count and obtain the accumulated energy-saving time.

In an embodiment, the processor 36 of the server 30 may determine the sub-score of the air conditioner usage according to the accumulated energy-saving time. The more the accumulated energy-saving time occupies the total time of the trip (for example, greater than a corresponding time threshold), the lower the sub-score of the air conditioner usage is, and the more energy is consumed. The less the accumulated energy-saving time occupies the total time of the trip (for example, less than the corresponding time threshold), the higher the sub-score of the air conditioner usage is, and the more energy is saved.

For example, regarding each temperature and each specific time (for example: one unit per minute), a situation that the in-vehicle temperature is lower than a standard value range in summer may be regarded as bad energy-saving driving, and a situation that the in-vehicle temperature is higher than the standard value range in winter may be regarded as bad energy-saving driving. The sub-score is calculated based on a proportion of each unit of the whole driving time (i.e., a total time of the trip) that falls within the bad driving range.

Table (1) is an example illustrating sub-scores of multiple energy-saving factors.

TABLE 1

| Energy-saving factor | Statistical result | Sub-score |
|---|---|---|
| Cruise control | 80% meets calculation standard | 80 |
| Coasting (any gear) | 58% meets calculation standard Road section A: braking twice 50% Road section B: braking 3 times 33% Road section C: braking twice 100% Road section D: braking twice 50% | 58 |
| Over-speeding | A total number of times of over-speeding of the motorcade is 26, driver A has 17 over-speeding events, reaching 65% of the standard compared with the average | 35 |
| Idling | An accumulated idling time of a single trip is 90 seconds, which is only 66% compared with a standard value | 66 |
| Anticipation | There are 13 emergency accidents on the road ahead, and the number of sudden brakes was 6 times (46%), which only reaches 39% compared with the standard value | 39 |
| Green band | 76% meets calculation standard | 76 |
| Air conditioner usage | 94% meets calculation standard | 94 |

In some embodiments, the sensing data may also be a tire pressure or a regular maintenance notification. The processor 36 of the server 30 may notify the remote device 40 or the on-board device 10 through the communication transceiver 33 according to a detection result of low tire pressure (for example, less than 10% of the standard) or an insurance notice.

In an embodiment, there are various energy-saving factors. The processor 36 of the server 30 may assign weights to these energy-saving factors, and perform weighting and/or normalization operations on the sub-scores of these energy-saving factors according to the corresponding weights, so as to obtain the energy-saving score.

Referring to FIG. 11, the processor 36 of the server 30 generates a driving behavior report based on the energy-saving scores (step S113). Specifically, the driving behavior report shows good and bad of the energy-saving scores. The processor 36 of the server 30 may select a reference score from the plurality of energy-saving scores (for example, for different vehicles or drivers), and respectively compare these energy-saving scores and the reference score, so as to learn whether the driving behavior is energy-saving, and then serve as a reference learning basis for energy-saving driving.

In an embodiment, the sensing data corresponds to multiple road sections in the route, and these road sections are classified according to road features. For example, straight road sections, turning road sections, uphill road sections, downhill road sections, highway road sections, or non-road sections. The processor 36 of the server 30 may respectively generate the energy-saving scores of these road sections, and compare the energy-saving scores of these road sections with the corresponding reference score. The driving behavior report includes comparison results of these road segments. In this way, different driving behaviors are compared for each road section, which helps the drivers to understand how to drive in the most fuel-efficient way under the same road conditions, so as to serve as an energy-saving driving indicator.

In an embodiment, the processor 36 of the server 30 may determine a driving state according to the driving behavior report. For example, the processor 36 of the server 30 grades a difference between the energy-saving score and the reference score, and determines the driving state based on the grade. The higher the grade is, the better the driving condition is. The lower the grade is, the worse the driving state is.

The processor 36 of the server 30 may notify a situation that the driving state is complied with a notification condition to the remote device 40 or the on-board device 10 through the communication transceiver 33. The notification condition is related to a ranking of the energy-saving scores.

For example, the processor 36 of the server 30 notifies the lower ranked vehicle or driver according to a grade ranking. Therefore, the processor 36 of the server 30 may remind the remote device 40 or the on-board device 10 with the driving state through the communication transceiver 33.

Figure 14:
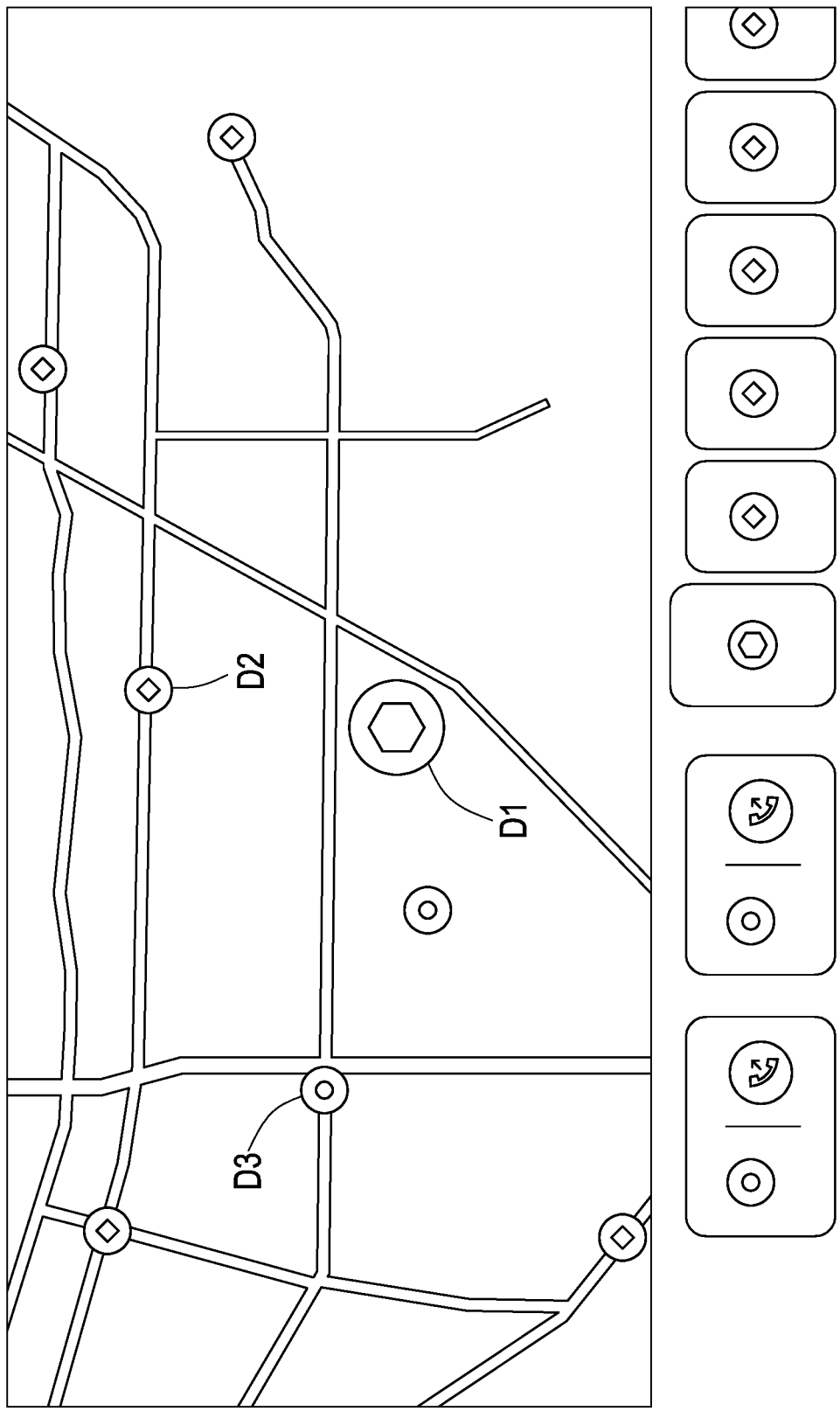
FIG. 14 is a schematic diagram of a driver analysis according to an embodiment of the disclosure.

For example, FIG. 14 is a schematic diagram of a driver analysis according to an embodiment of the disclosure. Referring to FIG. 14, assuming there are three grades, the energy-saving score of a grade D1 is the closest to the reference score, the energy-saving score of a grade D2 is the second closest to the reference score, and the energy-saving score of a grade D3 is the farthest from the reference score. The remote device 40 of an administrator may display positions of different vehicles on an electronic map, and distinguish the vehicles of different grades with different visual patterns/colors/texts. Regarding the grade D3, a user interface may further provide an option of direct communication, so that the administrator may remind the driver by voice.

In an embodiment, the processor 36 of the server 30 may count violations of each driver. The violations are, for example, distracted driving, fatigue driving, reverse driving, running red light, sudden braking, sharp turning, idling or over-speeding In an embodiment, during the trip, if the number of times of violations exceeds a corresponding number threshold, the processor 36 of the server 30 may notify the remote device or the on-board device 10. For example, the remote device 40 of the administrator highlights the vehicles with too many violations. In addition, the user interface may also provide the option of direct communication, so that the administrator may remind the driver by voice.

In an embodiment, the processor 36 of the server 30 may identify whether the passenger in the driver's seat in the in-vehicle image is a registered driver. For a non-registered driver, the user interface may further provide the option of direct communication, so that the administrator may remind the driver by voice.

Figure 15:
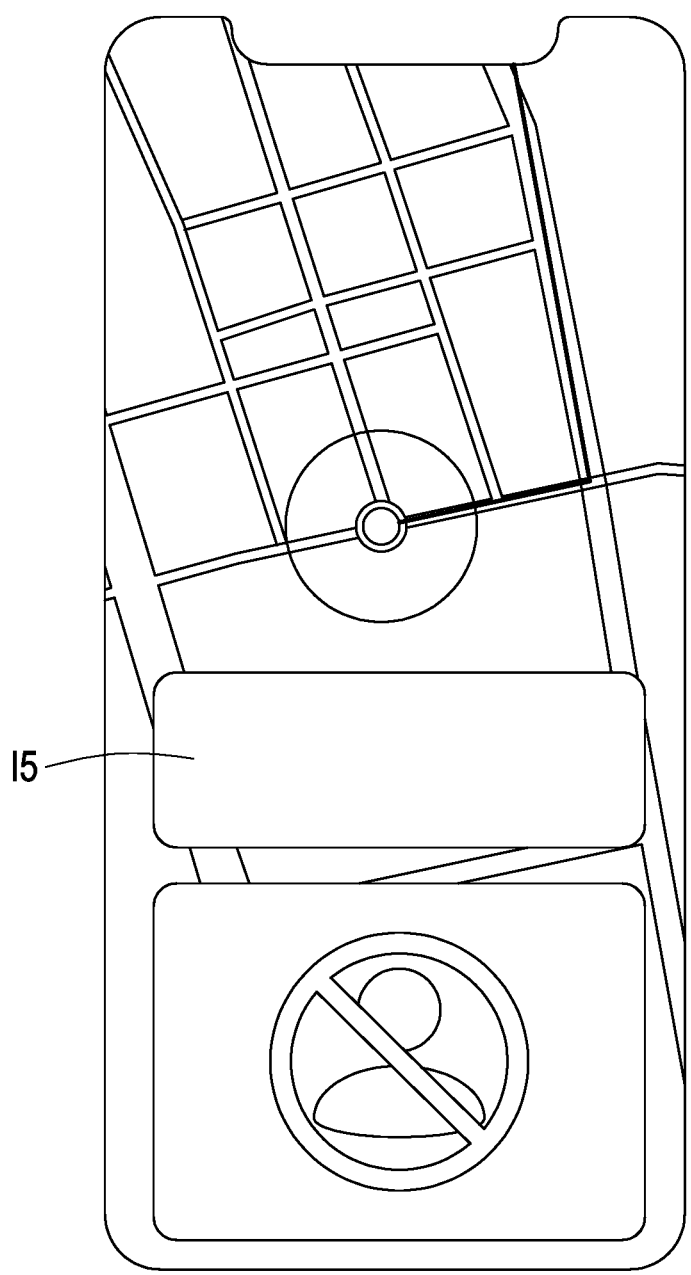
FIG. 15 is a schematic diagram of a notification of a remote device according to an embodiment of the disclosure.

FIG. 15 is a schematic diagram of a notification of the remote device 40 according to an embodiment of the disclosure. Referring to FIG. 15, the remote device 40 of the driver presents notification content I5, for example, attention is required on violations being too many, energy-saving scores being too low, or driving other than yourself.

In summary, in the evaluation method of locations, the analysis method of driving behavior, and the driver management system of the embodiments of the disclosure, the sensing data is collected, feature values are found from the sensing data, and are used as training data of algorithms in combination with review, so as to find suggested locations for parking. Sensors and image capturing devices on IoT devices or transport vehicles may continuously collect the sensing data, and the system may continuously train the algorithms for the suggested locations or update the database. The embodiment of the disclosure may provide an interface for data scientists or managers to modify, review, and mark the collected sensing data. The embodiment of the present disclosure also provides an interface for developers to adjust algorithm parameters to ensure that the suggested locations meet the user's expectations for the suggested locations. The embodiment of the disclosure further provides a scoring mechanism, which automatically compares the driving behaviors according to the road sections, and identifies the driving behavior of the driver with the highest energy-saving score to serve as a standard. The road section benchmark may be used as a basis for evaluating the driving behavior to produce a driving behavior report, so as to serve as a reference for driver training. In this way, the problem of inefficiency caused by novice drivers who are not familiar with the road conditions may be mitigated, which helps improve driving safety, save the operating cost caused by traditional drivers' education and training, and energy waste caused by bad driving habits, and improve the efficiency of novice drivers in performing tasks.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An analysis method of driving behavior, comprising:
   obtaining sensing data;
   determining an energy-saving score of the sensing data according to at least one energy-saving factor, wherein the energy-saving factor is a factor that affects an energy consumption of a vehicle, wherein the sensing data comprises a vehicle speed of the vehicle, the at least one energy-saving factor comprises a cruise control, the energy-saving score comprises a sub-score of the cruise control, and a step of determining the energy-saving score of the sensing data according to the at least one energy-saving factor comprises:
      counting a first accumulative difference between the vehicle speed and an energy-saving cruising speed in a trip;
      counting a second accumulative difference between the vehicle speed and a road speed limit in the trip; and
      determining the sub-score of the cruise control according to the first accumulative difference and the second accumulative difference; and
   generating a driving behavior report according to the energy-saving score, wherein the driving behavior report describes whether the energy-saving score is good or bad.

2. The analysis method of driving behavior according to claim 1, wherein the sensing data corresponds to a plurality of road sections in a route, the road sections are classified according to road features, and a step of generating the driving behavior report according to the energy-saving score comprises:
   respectively generating energy-saving scores of the road sections; and
   respectively comparing the energy-saving scores of the road sections with a corresponding reference score, wherein the driving behavior report comprises a comparison result of the road sections.

3. The analysis method of driving behavior according to claim 1, wherein the sensing data comprises a braking behavior of the vehicle, the at least one energy-saving factor comprises a coasting, the energy-saving score comprises a sub-score of the coasting, and a step of determining the energy-saving score of the sensing data according to the at least one energy-saving factor comprises:
   counting a number of times of a braking of the braking behavior of at least one stop point in a trip; and
   determining the sub-score of the coasting according to the number of times of the braking.

4. The analysis method of driving behavior according to claim 1, wherein the sensing data comprises an over-speeding behavior of the vehicle, the at least one energy-saving factor comprises an over-speeding, the energy-saving score comprises a sub-score of the over-speeding, and a step of determining the energy-saving score of the sensing data according to the at least one energy-saving factor comprises:
   determining an over-speeding event according to a duration of the over-speeding behavior;
   counting a number of times of the over-speeding of the over-speeding event in a trip; and
   determining the sub-score of the over-speeding according to the number of times of the over-speeding.

5. The analysis method of driving behavior according to claim 1, wherein the sensing data comprises a vehicle speed and an engine speed of the vehicle, the at least one energy-saving factor comprises an idling, the energy-saving score comprises a sub-score of the idling, and a step of determining the energy-saving score of the sensing data according to the at least one energy-saving factor comprises:
   determining an idling event according to the vehicle speed and the engine speed, wherein the idling event occurs when the vehicle speed is zero but the engine speed is greater than zero;
   counting an accumulated idling time of the idling event in a trip; and
   determining the sub-score of the idling according to the accumulated idling time.

6. The analysis method of driving behavior according to claim 1, wherein the sensing data comprises an acceleration and a vehicle speed of the vehicle, the at least one energy-saving factor comprises an anticipation event, the energy-saving score comprises a sub-score of the anticipation event, and a step of determining the energy-saving score of the sensing data according to the at least one energy-saving factor comprises:
   determining a sudden braking event according to the acceleration and the vehicle speed, wherein the sudden braking event occurs when the acceleration in a traveling direction of the vehicle is lower than an acceleration lower limit and a change period of the vehicle speed is greater than a change upper limit;
   counting a number of times of a sudden braking of the sudden braking event in a trip; and
   determining the sub-score of the anticipation event according to the number of times of the sudden braking.

7. The analysis method of driving behavior according to claim 1, wherein the sensing data comprises an engine speed of the vehicle, the at least one energy-saving factor comprises a green band, the energy-saving score comprises a sub-score of the green band, and the step of determining the energy-saving score of the sensing data according to the at least one energy-saving factor comprises:

counting an accumulated effective speed time of the engine speed complying with a target speed in a trip, wherein the target speed is determined according to a vehicle model of the vehicle and road conditions; and determining the sub-score of the green band according to the accumulated effective speed time.

8. The analysis method of driving behavior according to claim 1, wherein the sensing data comprises an in-vehicle temperature of the vehicle, the at least one energy-saving factor comprises an air conditioner usage, the energy-saving score comprises a sub-score of the air conditioner usage, and the step of determining the energy-saving score of the sensing data according to the at least one energy-saving factor comprises:

counting an accumulated energy-saving time of the in-vehicle temperature complying with a target temperature in a trip, wherein the target temperature is determined according to a weather; and determining the sub-score of the air conditioner usage according to the accumulated energy-saving time.

9. The analysis method of driving behavior according to claim 1, further comprising:

determining a driving state based on the driving behavior report; and notifying of a situation that the driving state complies with a notification condition, wherein the notification condition is related to a ranking of the energy-saving score.

10. A driver management system, comprising:

a server, communicatively connected to an on-board device, wherein the server determines an energy-saving score of sensing data of the on-board device according to at least one energy-saving factor, wherein the server generates a driving behavior report according to the energy-saving score, the at least one energy-saving factor is a factor that affects an energy consumption of a vehicle, and the driving behavior report describes whether the energy-saving score is good or bad, wherein the sensing data comprises a vehicle speed of the vehicle, the at least one energy-saving factor comprises a cruise control, the energy-saving score comprises a sub-score of the cruise control, and a step of determining the energy-saving score of the sensing data according to the at least one energy-saving factor comprises:

counting a first accumulative difference between the vehicle speed and an energy-saving cruising speed in a trip;

counting a second accumulative difference between the vehicle speed and a road speed limit in the trip; and determining the sub-score of the cruise control according to the first accumulative difference and the second accumulative difference.

11. The driver management system according to claim 10, wherein the sensing data comprises a braking behavior of the vehicle, the at least one energy-saving factor comprises a coasting, the energy-saving score comprises a sub-score of the coasting, and determining the energy-saving score of the sensing data according to the at least one energy-saving factor comprises:

counting a number of times of a braking of the braking behavior of at least one stop point in a trip; and determining the sub-score of the coasting according to the number of times of the braking.

12. The driver management system according to claim 10, wherein the sensing data comprises an over-speeding behavior of the vehicle, the at least one energy-saving factor comprises an over-speeding, the energy-saving score comprises a sub-score of the over-speeding, and determining the energy-saving score of the sensing data according to the at least one energy-saving factor comprises:

determining an over-speeding event according to a duration of the over-speeding behavior;

counting a number of times of the over-speeding of the over-speeding event in a trip; and determining the sub-score of the over-speeding according to the number of times of the over-speeding.

13. The driver management system according to claim 10, wherein the sensing data comprises a vehicle speed and an engine speed of the vehicle, the at least one energy-saving factor comprises an idling, the energy-saving score comprises a sub-score of the idling, and determining the energy-saving score of the sensing data according to the at least one energy-saving factor comprises:

determining an idling event according to the vehicle speed and the engine speed, wherein the idling event occurs when the vehicle speed is zero but the engine speed is greater than zero;

counting an accumulated idling time of the idling event in a trip; and determining the sub-score of the idling according to the accumulated idling time.

14. The driver management system according to claim 10, wherein the sensing data comprises an acceleration and a vehicle speed of the vehicle, the at least one energy-saving factor comprises an anticipation event, the energy-saving score comprises a sub-score of the anticipation event, and determining the energy-saving score of the sensing data according to the at least one energy-saving factor comprises:

determining a sudden braking event according to the acceleration and the vehicle speed, wherein the sudden braking event occurs when the acceleration in a traveling direction of the vehicle is lower than an acceleration lower limit and a change period of the vehicle speed is greater than a change upper limit;

counting a number of times of a sudden braking of the sudden braking event in a trip; and determining the sub-score of the anticipation event according to the number of times of the sudden braking.

15. The driver management system according to claim 10, wherein the sensing data comprises an engine speed of the vehicle, the at least one energy-saving factor comprises a green band, the energy-saving score comprises a sub-score of the green band, and determining the energy-saving score of the sensing data according to the at least one energy-saving factor comprises:

counting an accumulated effective speed time of the engine speed complying with a target speed in a trip, wherein the target speed is determined according to a vehicle model of the vehicle and road conditions; and determining the sub-score of the green band according to the accumulated effective speed time.

16. The driver management system according to claim 10, wherein the sensing data comprises an in-vehicle temperature of the vehicle, the at least one energy-saving factor comprises an air conditioner usage, the energy-saving score comprises a sub-score of the air conditioner usage, and determining the energy-saving score of the sensing data according to the at least one energy-saving factor comprises:

counting an accumulated energy-saving time of the in-vehicle temperature complying with a target temperature in a trip, wherein the target temperature is determined according to a weather; and determining the sub-score of the air conditioner usage according to the accumulated energy-saving time.

17. The driver management system according to claim 10, wherein the server further:
   determines a driving state based on the driving behavior report; and
   notifies of a situation that the driving state complies with a notification condition, wherein the notification condition is related to a ranking of the energy-saving score.

* * * * *